(12) United States Patent
Takahashi et al.

(10) Patent No.: US 9,221,538 B2
(45) Date of Patent: Dec. 29, 2015

(54) FLIGHT CONTROL SYSTEM FOR UNMANNED AERIAL VEHICLE

(71) Applicant: FUJI JUKOGYO KABUSHIKI KAISHA, Shinjuku-ku, Tokyo (JP)

(72) Inventors: Shinei Takahashi, Tokyo (JP); Kenshi Miyata, Tokyo (JP); Akitoshi Sakaguchi, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/462,795

(22) Filed: Aug. 19, 2014

(65) Prior Publication Data

US 2015/0073624 A1 Mar. 12, 2015

(30) Foreign Application Priority Data

Sep. 12, 2013 (JP) .................................. 2013-188927

(51) Int. Cl.
*B64C 39/02* (2006.01)
*B64D 43/00* (2006.01)

(52) U.S. Cl.
CPC .............. *B64C 39/024* (2013.01); *B64D 43/00* (2013.01)

(58) Field of Classification Search
CPC ...... B64C 39/024; B64C 13/20; B64C 19/00; B64C 1/00; B64C 1/30; B64C 2001/0045; B64C 37/00; B64D 43/00; G08G 5/0069
See application file for complete search history.

(56) References Cited

U.S. PATENT DOCUMENTS

2007/0252029 A1* 11/2007 Karem .......................... 244/1 R

FOREIGN PATENT DOCUMENTS

JP 08-080898 A 3/1996

* cited by examiner

*Primary Examiner* — James Trammell
*Assistant Examiner* — James E Stroud
(74) *Attorney, Agent, or Firm* — McDermott Will & Emery LLP

(57) ABSTRACT

A flight control system controls flight of an unmanned aerial vehicle by control signals of the unmanned aerial vehicle itself and from a ground facility. The unmanned aerial vehicle and the ground facility are each provided with at least one flight control unit (FCU) capable of controlling driving of an airframe actuator based on a sensor output signal from an airframe sensor. The at least one FCU on the unmanned aerial vehicle and the at least one FCU of the ground facility constitute a redundant system for flight control function. In the redundant system one of the at least one FCU on the unmanned aerial vehicle serves as a main unit. In the case where a malfunction has occurred in an FCU that performs flight control on the unmanned aerial vehicle, the ground facility is capable of causing another FCU to take over flight control function from the FCU.

2 Claims, 1 Drawing Sheet

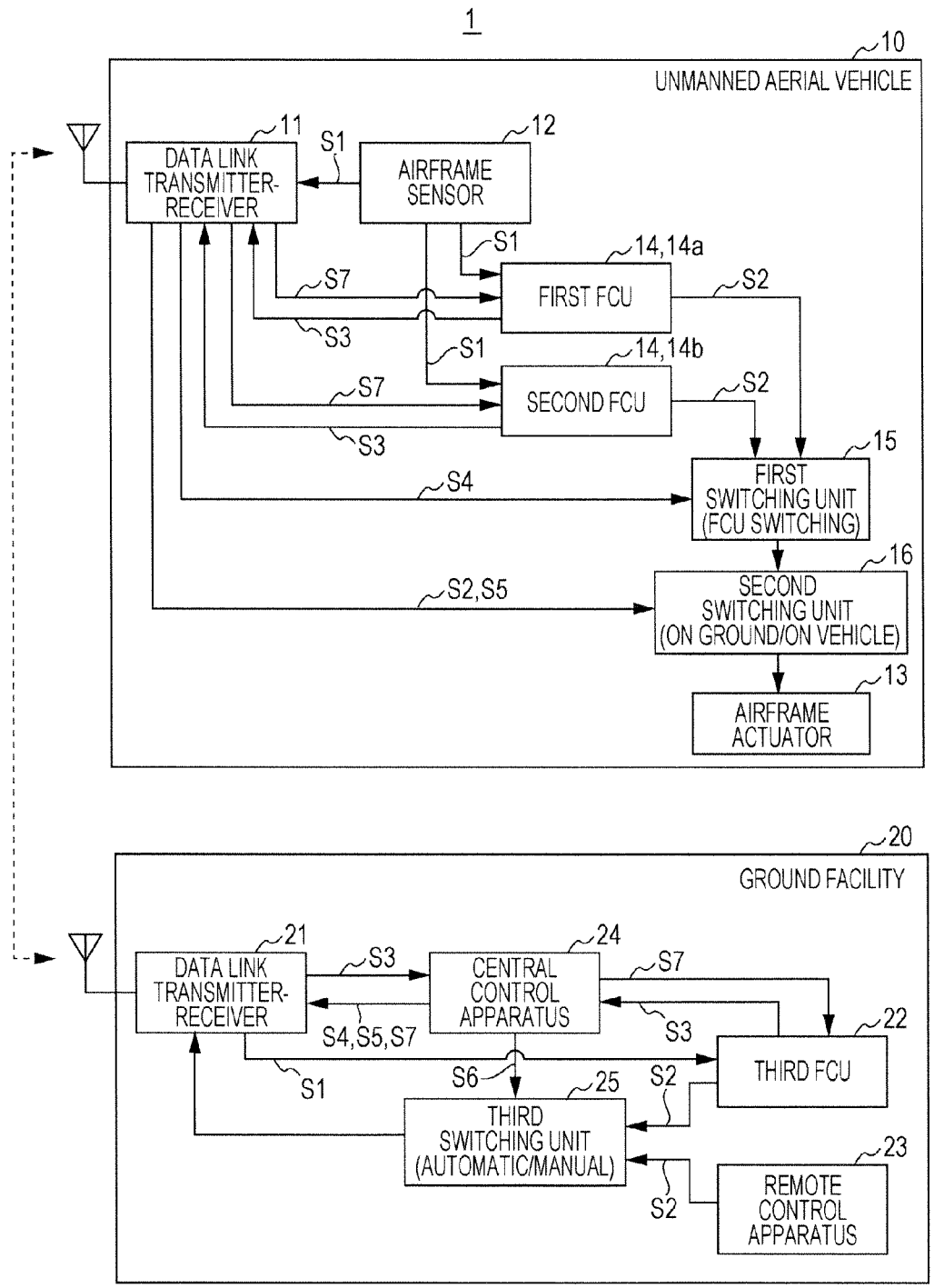

FLIGHT CONTROL SYSTEM FOR UNMANNED AERIAL VEHICLE

CROSS-REFERENCE TO RELATED APPLICATIONS

The present application claims priority from Japanese Patent Application No. 2013-188927 filed on Sep. 12, 2013, the entire contents of which are hereby incorporated by reference.

BACKGROUND

1. Technical Field

The present disclosure relates to a flight control system for an unmanned aerial vehicle, and particularly to a useful technology for achieving redundancy in the flight control function of the flight control system.

2. Related Art

In an unmanned aerial vehicle which flies without a pilot, a flight control unit mounted in an airframe typically performs flight control based on a sensor output signal from an airframe sensor and/or a control signal from a ground facility. In order to improve the reliability of flight control in this kind of unmanned aerial vehicle, a plurality of flight control units may be mounted in the airframe so as to achieve redundancy in flight control function. However, mounting a plurality of flight control units is definitely not preferable in consideration of weight and mounting space, and may be difficult in the first place due to various restrictions.

Thus, according to the technology described in Japanese Unexamined Patent Application Publication (JP-A) No. 8-80898, a flight control unit (automatic control unit) is not mounted in the unmanned aerial vehicle itself, but a plurality of flight control units are provided in the ground facility. With this technology, it is possible to achieve redundancy in flight control function by the flight control units provided in the ground facility while performing flight control of the unmanned aerial vehicle by transmitting airframe control signals to the unmanned aerial vehicle, the airframe control signals being generated by the flight control units of the ground facility based on sensor output signals from an airframe sensor.

However, the technology described in JP-A No. 8-80898 mentioned above adopts a control configuration in which sensor output signals and airframe control signals are constantly transmitted and received via a data link between the airframe and the ground facility, and thus compared with the case where a flight control unit is mounted in the airframe, control accuracy may be reduced. Because the data link between the airframe and the ground facility may have limited data amount and/or data delay, adopting such a control configuration all the time is not preferable when more highly accurate flight control is desired except where such a control configuration is adopted only in an emergency when the main flight control unit has a failure.

SUMMARY OF THE INVENTION

The present disclosure has been made in consideration of the above-mentioned problem, and provides a flight control system for an unmanned aerial vehicle, the flight control system being capable of achieving redundancy in flight control function favorably while implementing highly accurate flight control even when a certain number of flight control units for ensuring sufficient redundancy may not be mounted in the unmanned aerial vehicle.

A first aspect of the present disclosure provides a flight control system for an unmanned aerial vehicle including a ground facility. The flight control system controls flight of the unmanned aerial vehicle by a control signal of the unmanned aerial vehicle itself and a control signal from the ground facility. The unmanned aerial vehicle and the ground facility are each provided with at least one flight control unit capable of controlling driving of an airframe actuator that operates parts of the unmanned aerial vehicle based on a sensor output signal from an airframe sensor that detects a flight state of the unmanned aerial vehicle. The at least one flight control unit on the unmanned aerial vehicle and the at least one flight control unit of the ground facility constitute a redundant system for flight control function. In the redundant system for flight control function, one of the at least one flight control unit on the unmanned aerial vehicle serves as a main unit. In the case where a malfunction has occurred in a flight control unit that performs flight control on the unmanned aerial vehicle, the ground facility is capable of causing another flight control unit to take over flight control function from the flight control unit. Here, the "main unit" refers to the unit that primarily functions in a normal state in which each part of the flight control system operates normally.

The unmanned aerial vehicle and the ground facility may be each provided with a signal transmission and reception unit capable of mutually transmitting and receiving a signal. The at least one flight control unit on the unmanned aerial vehicle may output computation result data based on the sensor output signal. The computation result data may be transmitted to the ground facility via the signal transmission and reception unit. The at least one flight control unit of the ground facility may output computation result data based on the sensor output signal transmitted from the unmanned aerial vehicle. In the ground facility, a comparison may be made between the computation result data by the at least one flight control unit of the ground facility and the computation result data transmitted from the unmanned aerial vehicle to determine whether or not a malfunction has occurred in a flight control unit which performs flight control.

The unmanned aerial vehicle may be equipped with two flight control units which are a main unit and a first backup unit, and the ground facility may equipped with a flight control unit which is a second backup unit.

BRIEF DESCRIPTION OF THE DRAWINGS

FIG. 1 is a block diagram illustrating the configuration of a flight control system for an unmanned aerial vehicle.

DETAILED DESCRIPTION

Hereinafter, an implementation of the present disclosure will be described with reference to the accompanying drawings.

[Configuration]

FIG. 1 is a block diagram illustrating the configuration of a flight control system (hereinafter simply referred to as a "flight control system") 1 for an unmanned aerial vehicle in the present implementation. As illustrated in FIG. 1, the flight control system 1 controls the flight of an unmanned aerial vehicle 10 by control signals from a ground facility 20.

The unmanned aerial vehicle 10 includes an airframe sensor 12, an airframe actuator 13, and two flight control units (FCU) 14, in addition to a data link transmitter-receiver 11 which together with the below-described data link transmitter-receiver 21 on the ground facility 20 forms data link and is capable of transmitting and receiving various signals to and from the data link transmitter-receiver 21.

The airframe sensors 12 are various types of sensors for detecting the flight state of the unmanned aerial vehicle 10, and include a gyro sensor, a speed sensor, a global positioning system (GPS), and an altitude sensor. The airframe sensor 12 outputs detected various flight state data as sensor output signal S1 to the data link transmitter-receiver 11 and the two FCUs 14. The airframe actuator 13 includes various types of actuators that operate several parts of the unmanned aerial vehicle 10, specifically, the several parts including an aileron, a ladder, an elevator, a throttle, a flap, and a leg.

The two FCUs 14 each generate a driving control signal S2 for controlling the driving of the airframe actuator 13 based on the below-described automatic control mode signal S7 transmitted from the ground facility 20 and the sensor output signal S1 from the airframe sensor 12, and output the driving control signal S2 to the data link transmitter-receiver 11 and the airframe actuator 13. The two FCUs 14 each output computation result data as FCU output signal S3 to the data link transmitter-receiver 11, the computation result data being based on the automatic control mode signal S7 and/or the sensor output signal S1. The two FCUs 14 are a first FCU 14a and a second FCU 14b, between which the first FCU 14a is the main unit that primarily functions (performs flight control) in a normal state, and the second FCU 14b is the first backup unit for the first FCU 14a.

The two FCUs 14 are connected to the airframe actuator 13 via a first switching unit 15 and a second switching unit 16 in this order. Out of the switching units, the first switching unit 15 switches the driving control signal S2 between the first FCU 14a and the second FCU 14b, the driving control signal being inputted to the airframe actuator 13. The first switching unit 15 is configured to receive an input of a driving control signal S2 from the first FCU 14a in a normal state. On the other hand, the second switching unit 16 switches the driving control signal S2 between an FCU 14 (the first FCU 14a or the second FCU 14b) on the unmanned aerial vehicle 10 and a third FCU 22 of the ground facility 20 described later, the driving control signal being inputted to the airframe actuator 13. The second switching unit 15 is configured to input a driving control signal S2 to the airframe actuator 13 in a normal state, the driving control signal S2 being from the FCU 14 on the unmanned aerial vehicle 10. The first switching unit 15 and the second switching unit 16 perform a switching operation upon receiving input of the below-described first switching signal S4 and second switching signal S5 which have been transmitted from the ground facility 20 via the data link transmitter-receiver 11.

The ground facility 20 includes the third FCU 22, a remote control apparatus 23, and a central control apparatus 24 in addition to the data link transmitter-receiver 21 capable of transmitting and receiving various signals to and from the data link transmitter-receiver 11 of the unmanned aerial vehicle 10.

The third FCU 22 is an FCU (flight control unit) similar to the FCU 14 mounted in the unmanned aerial vehicle 10. That is, the third FCU 22 generates a driving control signal S2 based on a sensor output signal S1 and an automatic control mode signal S7 to output the driving control signal S2 to the data link transmitter-receiver 21, the sensor output signal S1 being transmitted via a data link from the unmanned aerial vehicle 10, the below-described automatic control mode signal S7 being inputted from the central control apparatus 24. The third FCU 22 outputs computation result data as FCU output signal S3 to the central control apparatus 24, the computation result data being based on the automatic control mode signal S7 and the sensor output signal S1. The third FCU 22 is the second backup unit for the first FCU 14a which is mounted in the unmanned aerial vehicle 10. That is, the first FCU 14a and the second FCU 14b on the unmanned aerial vehicle 10 and the third FCU 22 of the ground facility 20 constitute a redundant system of flight control function where the first FCU 14a on the unmanned aerial vehicle 10 serves as the main unit.

The remote control apparatus 23 allows an operator to perform remote control (manual control) of the unmanned aerial vehicle 10, and outputs a driving control signal S2 for the airframe actuator 13 according to the control operation to the data link transmitter-receiver 21. When the remote control is performed with the remote control apparatus 23, an operator performs a control operation while watching a device (for example, a display of the central control apparatus 24) by which the flight state of the unmanned aerial vehicle 10 can be visually recognized.

The remote control apparatus 23 and the third FCU 22 are connected to the data link transmitter-receiver 21 via a third switching unit 25. The third switching unit 25 switches the driving control signal S2 between the third FCU 22 and the remote control apparatus 23, the driving control signal S2 being transmitted to the unmanned aerial vehicle 10 via the data link transmitter-receiver 21. The third switching unit 25 is configured to input the driving control signal S2 from the third FCU 22 to the data link transmitter-receiver 21 in a normal state, and performs a switching operation upon receiving input of the later-described third switching signal S6 from the central control apparatus 24.

The central control apparatus 24 controls the flight control system 1 in a centralized manner. Specifically, the central control apparatus 24 transmits an automatic control mode signal S7 to the unmanned aerial vehicle 10 via the data link transmitter-receiver 21 and outputs the automatic control mode signal S7 to the third FCU 22, the automatic control mode signal S7 specifying a control mode for automatic take-off and landing, automatic navigation, or the like. As described below, the central control apparatus 24 monitors the operating conditions of each FCU based on FCU output signals S3 and determines whether or not an FCU performing the flight control needs to be switched, the FCU output signals S3 being transmitted from the unmanned aerial vehicle 10 via the data link transmitter-receiver 21 or being inputted from the third FCU 22. When it is determined that the FCU needs to be switched, the central control apparatus 24 transmits a first switching signal S4 or a second switching signal S5 to the unmanned aerial vehicle 10 via the data link transmitter-receiver 21 or outputs a third switching signal S6 to the third switching unit 25.

[Operation]

Next, the operation of the flight control system 1 will be described. First, the operation of the flight control system 1, which is in a normal state and each component is in normal operation, will be described.

In a normal state, the first FCU 14a on the unmanned aerial vehicle 10 performs flight control of the unmanned aerial vehicle 10 as the main FCU. Specifically, the first FCU 14a generates a driving control signal S2 based on a sensor output signal S1 inputted from the airframe sensor 12 and outputs the driving control signal S2 to the airframe actuator 13, thereby controlling the driving of the airframe actuator 13. At this point, the first FCU 14a receives an automatic control mode signal S7, which specifies a control mode for automatic take-off and landing, automatic navigation, and others, from the central control apparatus 24 of the ground facility 20, and generates a driving control signal S2 corresponding to the control mode specified by the automatic control mode signal S7. In addition, the first FCU 14a transmits an FCU output signal S3 to the central control apparatus 24 of the ground facility 20, the FCU output signal being computation result data when a driving control signal S2 is generated.

At this point, the second FCU 14b on the unmanned aerial vehicle 10 and the third FCU 22 of the ground facility 20 also operate in the same manner as the first FCU 14a, the second FCU 14b being a backup unit for the first FCU 14a. That is, the second FCU 14b and the third FCU 22 each generate a driving control signal S2 based on a sensor output signal S1 and an automatic control mode signal S7 to output the driving control signal S2 to the airframe actuator 13 and to output an FCU output signal S3 to the central control apparatus 24. Out of the signals S2, S3, the driving control signal S2 is blocked by the first switching unit 15 and the second switching unit 16, and so is not inputted to the airframe actuator 13, but the FCU output signal S3 is inputted to the central control apparatus 24. The central control apparatus 24 makes a comparison between three FCU output signals S3 inputted from the three FCUs including the first FCU 14a, and thereby constantly monitors whether or not the first FCU 14a is in normal operation.

Next, the operation of the flight control system 1 in the case where a malfunction occurs in the first FCU 14a on the unmanned aerial vehicle 10 will be described.

As described above, the central control apparatus 24 of the ground facility 20 makes a comparison between three FCU output signals S3 inputted from the three FCUs (the first FCU 14a, the second FCU 14b, and the third FCU 22), and thereby constantly monitors the operating conditions of the first FCU 14a. For example, in the case where an FCU output signal S3 from the first FCU 14a includes data which is not common with other two FCUs, the central control apparatus 24 determines that a malfunction has occurred in the first FCU 14a and so the current FCU performing flight control needs to be switched.

The central control apparatus 24 then transmits a first switching signal S4 to the unmanned aerial vehicle 10 via the data link transmitter-receiver 21, and inputs the first switching signal S4 to the first switching unit 15. Upon receiving input of the first switching signal S4, the first switching unit 15 switches the signal line so that instead of a driving control signal S2 from the first FCU 14a, a driving control signal S2 from the second FCU 14b is inputted to the airframe actuator 13. In this manner, instead of the first FCU 14a which is determined to have a malfunction, the second FCU 14b, which is in normal operation, performs flight control of the unmanned aerial vehicle 10, and thus a normal flight control state is maintained. At this point, the central control apparatus 24 makes a comparison between two FCU output signals S3 inputted from the second FCU 14b and the third FCU 22, and thereby constantly monitors whether or not the second FCU 14b is in normal operation.

In this state, the central control apparatus 24, when determining that a malfunction has further occurred in the second FCU 14b and so the current FCU performing flight control needs to be switched, switches the current FCU from the second FCU 14b to the third FCU 22. Specifically, the central control apparatus 24 transmits a second switching signal S5 to the unmanned aerial vehicle 10 via the data link transmitter-receiver 21, and inputs the second switching signal to the second switching unit 16. Upon receiving input of the second switching signal S5, the second switching unit 16 switches the signal line so that instead of a driving control signal S2 from the second FCU 14b, a driving control signal S2 from the third FCU 22 of the ground facility 20 is inputted to the airframe actuator 13. In this manner, instead of the second FCU 14b which is determined to have a malfunction, the third FCU 22, which is in normal operation, performs flight control of the unmanned aerial vehicle 10, and thus a normal flight control state is maintained.

In this state, in the case where the central control apparatus 24 determines that a malfunction has further occurred in the third FCU 22 also, or a switching operation to manual control is inputted to the central control apparatus 24 by a monitoring crew, the central control apparatus 24 switches the current flight control unit from the third FCU 22 to the remote control apparatus 23. Specifically, the central control apparatus 24 outputs a third switching signal S6 to the third switching unit 25, thereby causing the third switching unit 25 to switch the signal line so that instead of a driving control signal S2 from the third FCU 22, a driving control signal S2 from the remote control apparatus 23 is transmitted to the unmanned aerial vehicle 10. In this manner, instead of the third FCU 22, an operator who operates the remote control apparatus 23 performs flight control of the unmanned aerial vehicle 10.

As described above, with the flight control system 1 of the present implementation, the first FCU 14a on the unmanned aerial vehicle 10 performs flight control as the main unit in a normal state, and in the case where a malfunction has occurred in the first FCU 14a (or the second FCU 14b) on the unmanned aerial vehicle 10, one of other FCUs including the third FCU 22 of the ground facility 20 can take over the flight control function as a substitute. Therefore, even when a certain number of FCUs for ensuring sufficient redundancy may not be mounted in the unmanned aerial vehicle 10, redundancy in flight control function can be favorably achieved while implementing highly accurate flight control.

Even in the case where a malfunction has occurred in both of the two FCUs 14 on the unmanned aerial vehicle 10, the central control apparatus 24 of the ground facility 20 causes the third FCU 22 of the ground facility 20 to take over the flight control function, and thus flight control of the unmanned aerial vehicle 10 can be performed by the third FCU 22. Consequently, as long as the data link between the unmanned aerial vehicle 10 and the ground facility 20 functions, normal flight control state of the unmanned aerial vehicle 10 can be maintained.

It should be noted that an implementation to which the present disclosure is applicable is not limited to the above-described implementation and may be modified as necessary in a range not departing from the spirit of the present disclosure.

Although two FCUs 14 (the first FCU 14a and the second FCU 14b) are mounted in the unmanned aerial vehicle 10 and the third FCU 22 is provided for the ground facility 20 as one example in the above-described implementation, the unmanned aerial vehicle 10 and the ground facility 20 each may be provided with at least one FCU (flight control unit).

Although it has been described that the central control apparatus 24 of the ground facility 20 takes over the flight control function in the case where (it is determined that) a malfunction has occurred in the FCU performing flight control, it is preferable that a monitoring crew for the central control apparatus 24 eventually issues a command for takeover. More particularly, in this case, it is preferable that a monitoring crew (person) finally determines whether or not and how the flight control function is taken over in overall consideration of all relevant information including a result determined by the central control apparatus 24.

Although it has been described that the central control apparatus 24 makes a comparison between FCU output signals S3 which are computation result data outputted from the FCUs when it is determined whether or not a malfunction has occurred in the current FCU performing flight control, the central control apparatus 24 may make a comparison between driving control signals S2 for controlling the driving of the airframe actuator 13.

The invention claimed is:

1. A flight control system for an unmanned aerial vehicle, the flight control system comprising a ground facility, wherein
   the flight control system controls flight of the unmanned aerial vehicle by a control signal of the unmanned aerial vehicle itself and a control signal from the ground facility;
   the unmanned aerial vehicle and the ground facility are each provided with at least one flight control unit capable of controlling driving of an airframe actuator that operates parts of the unmanned aerial vehicle based on a sensor output signal from an airframe sensor that detects a flight state of the unmanned aerial vehicle;
   the at least one flight control unit on the unmanned aerial vehicle and the at least one flight control unit of the ground facility constitute a redundant system for flight control function in which one of the at least one flight control unit on the unmanned aerial vehicle serves as a main unit;
   in the case where a malfunction has occurred in a flight control unit that performs flight control on the unmanned aerial vehicle, the ground facility is capable of causing another flight control unit to take over flight control function from the flight control unit;
   the unmanned aerial vehicle and the ground facility are each provided with a signal transmission and reception unit capable of mutually transmitting and receiving a signal;
   the at least one flight control unit on the unmanned aerial vehicle outputs computation result data based on the sensor output signal, and the computation result data are transmitted to the ground facility via the signal transmission and reception unit;
   the at least one flight control unit of the ground facility outputs computation result data based on the sensor output signal transmitted from the unmanned aerial vehicle; and
   in the ground facility, a comparison is made between the computation result data by the at least one flight control unit of the ground facility and the computation result data transmitted from the unmanned aerial vehicle to determine whether or not a malfunction has occurred in a flight control unit which performs flight control.

2. The flight control system for an unmanned aerial vehicle according to claim 1, wherein
   the unmanned aerial vehicle is equipped with two flight control units which are a main unit and a first backup unit; and
   the ground facility is equipped with a flight control unit which is a second backup unit.

* * * * *